US006471826B2

(12) United States Patent
Glover et al.

(10) Patent No.: US 6,471,826 B2
(45) Date of Patent: Oct. 29, 2002

(54) METHODS TO CONTROL ORGANIC CONTAMINANTS IN FIBERS

(75) Inventors: Daniel E. Glover, Brighton, TN (US); Percy Jaquess, Friendship, TN (US); James W. Fitzhenry, Memphis, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 0 days.

(21) Appl. No.: 09/883,140

(22) Filed: Jun. 15, 2001

(65) Prior Publication Data

US 2002/0059998 A1 May 23, 2002

Related U.S. Application Data

(60) Provisional application No. 60/211,942, filed on Jun. 16, 2000.

(51) Int. Cl.⁷ .............................................. D21H 21/02
(52) U.S. Cl. ................... 162/158; 162/199; 162/DIG. 4
(58) Field of Search ............................ 162/5, 72, 199, 162/DIG. 4, 158, 164.6

(56) References Cited

U.S. PATENT DOCUMENTS

| | | | | |
|---|---|---|---|---|
| 4,765,867 A | * | 8/1988 | Dreisbach et al. ...... | 162/DIG. 4 |
| 5,110,412 A | * | 5/1992 | Fuentes et al. ................ | 162/5 |
| 5,176,796 A | * | 1/1993 | Irie et al. ............... | 162/DIG. 4 |
| 5,200,164 A | | 4/1993 | Medalia et al. ............. | 423/265 |
| 5,223,097 A | * | 6/1993 | Hassler .................. | 162/DIG. 4 |
| 5,256,252 A | | 10/1993 | Sarkar et al. ............. | 162/168.2 |
| 5,300,194 A | * | 4/1994 | Welkener et al. ....... | 162/DIG. 4 |
| 5,356,800 A | | 10/1994 | Jaquess ....................... | 435/188 |
| 5,507,952 A | | 4/1996 | Jaquess et al. .............. | 210/632 |
| 5,575,993 A | | 11/1996 | Ward et al. ................. | 424/78.1 |
| 5,616,215 A | * | 4/1997 | Heldt-Hansen et al. ..................... | 162/DIG. 4 |
| 5,667,634 A | * | 9/1997 | Fujita et al. ........... | 162/DIG. 4 |
| 5,681,862 A | | 10/1997 | Hollis et al. ................. | 514/642 |
| 5,780,283 A | | 7/1998 | Lee ............................. | 435/188 |
| 5,837,097 A | * | 11/1998 | Egawa et al. .................. | 162/5 |
| 5,879,509 A | * | 3/1999 | Sharyo et al. ................. | 162/5 |
| 6,027,610 A | | 2/2000 | Back et al. | |

FOREIGN PATENT DOCUMENTS

| | | |
|---|---|---|
| WO | WO 92/13130 | 8/1992 |
| WO | WO 97/15711 | 5/1997 |
| WO | WO 98/36086 | 8/1998 |

OTHER PUBLICATIONS

Copy of International Search Report for PCT/US01/19144 dated Feb. 1, 2002.
Sykes, et al. "Enzymatic Removal of Stickie Contaminants", *Pulping Conference*, 1997, pp. 687–691.
Knudsen, et al. "Long–Term Use of Enzymatic Deinking at Stora Dalum Plant", 7ᵗʰ *International Conference on Biotechnology in the Pulp Paper Industry, Oral Presentations vol. A*, Jun., 1998, pp. 1–4.
Genecor® International Brochure, "Pancreatic Lipase 250", (5 pages), no date provided.
Glover, "Stickies" (2 pages), no date provided.
Wong, et al., "Enzymatic Processing for Pulp and Paper Manufacture—a Review", *APPITA Journal*, vol. 52, No. 6, 1999, pp. 409–418.

\* cited by examiner

*Primary Examiner*—Peter Chin
(74) *Attorney, Agent, or Firm*—Kilyk & Bowersox, P.L.L.C.

(57) ABSTRACT

Methods to control organic contaminants in fibers are described. One method involves contacting the fibers with a composition containing at least one esterase or lipase or both for a sufficient time and in a sufficient amount to control the organic contaminants present in the fibers. Preferably, the fibers are recycled fibers originating from a variety of sources such as old corrugated containers, old newsprint, mixed office waste, and the like. Resulting paper products formed from the processed fibers are also described as well as methods to make them.

25 Claims, 6 Drawing Sheets

METHODS TO CONTROL ORGANIC CONTAMINANTS IN FIBERS

This application claims the benefit under 35 U.S.C. § 119(e) of prior U.S. Provisional Patent Application No. 60/211,942 filed Jun. 16, 2000, which is incorporated in its entirety by reference herein.

BACKGROUND OF THE INVENTION

The present invention relates to paper making processes and more particularly relates to controlling the organic contaminants present in certain types of fibers used to make paper or similar types of fiber containing products.

Conventional recycling of old paper products such as old new print, old corrugated containers, and mixed office waste is an important aspect of papermills today due to environmental demands that many paper containing products have a portion of recycled fibers contained within the paper product. Thus, papermills are in a situation where the recycling of paper products is a necessity. However, the recycling of the paper products generally requires additional processing steps in order to lead to fibers which can be useable in paper products.

Conventional recycling of old newspapers to obtain fibers comparable to the type of fibers used to originally make the newsprint is known in the art as "de-inking," and typically involves pulping, washing, usually with surfactants, screening, solubilizing insoluble contaminants usually by strong caustic treatments, washing, and bleaching of the fibers to counteract the yellowing effects of caustic treatments.

Generally, the first step in conventional recycling is to separate the paper into individual fibers with water to form a pulp slurry followed by removing ink and contaminants from the fibers by a combination of various process steps, such as screening, centrifugal cleaning, washing, flotation, and the like. The screening and centrifugal cleaning step removes large contaminants, such as paperclips, staples, plastics, and the like. The primary purpose of washing and flotation steps is to solubilize and/or suspend contaminants in the water and to remove the contaminants from the water. Surfactants and caustic agents are added to facilitate the solubilization and separation of contaminants from the fibers. Once caustic agents are used, some yellowing of the fibers occurs which results in a need to bleach the fibers. The fibers are blended with, typically, virgin fibers and then used in the papermaking process for which the fiber properties are suitable. Recent developments in waste paper de-inking make use of enzymes to aid in the detachment and removal of inks from the fibers. These processes describe the use of particular types of enzymes to facilitate ink removal without the negative effects of caustic treatment on brightness along with the use of flotation to remove the agglomerated ink particles.

In the past, chemical additives such as caustic agents have been added to remove organic contaminants, known as "stickies." Stickies are generally adhesives, glues, hot melts, coatings, coating binders, ink residues, de-inking chemicals, wood resins, rosin, and unpulped wet strength resins that typically are present with the fiber to be recycled. These organic contaminants typically must be removed in substantial quantities so that they don't effect the subsequent processing steps. There is always a desire in the papermaking industry to develop new methods to remove such organic contaminants in more effective and environmentally friendly ways.

"Stickies" can be generally described as tacky, hydrophobic, pliable organic materials found in recycled paper systems. Stickies have a broad range of melting points and different degrees of tackiness dependent upon the composition of the stickies. Temperature, pH, concentration, size, and composition can affect the tackiness of stickies.

Recycled paper fibers contain many components that when repulped in recycle fiber plants become stickies. Recycled furnishes may have as many as a dozen different types of stickies, each having its own characteristics. Sources of stickies may include any of the following: adhesives, hot melts, coating binders, ink residues, deinking chemicals, wood resins, rosin, pitch, and wet strength resins. The actual tacky deposits found on paper machines may be a combination of several of these organic contaminants as well as inorganic particles such as talc, clay, or calcium carbonate.

Stickies deposit on machine surfaces, fabrics, wires, felts, and rolls and lead to problems such as wet end breaks, pressroom breaks, dryer section breaks, holes, sheet defects, and high dirt counts. These deposits and associated problems lead to a significant amount of downtime yearly. The cost of stickies has been estimated at over 500 million dollars annually in the U.S., when considering the cost of downtime, chemical costs, production losses, rejected materials, and customer complaints.

There are typically two main methods of removing stickies, mechanical and chemical. Mechanical methods include screening, cleaning, washing, floating, and dispersing, with each method designed to remove a different size contaminant. Screening typically removes larger or macro stickies(>0.004 inch or 100 microns). Forward and reverse cleaners can be used. Based on density differences using centrifugal force, forward cleaners remove contaminants heavier than water and reverse cleaners remove particles lighter than water. This method removes more macro stickies than micro stickies. Floating removes intermediate size stickies (50–300 microns), which are troublesome, because they're small enough to be accepted by screening and cleaning but too large to be removed by washing. In dispersing, the stock is thickened, passed through a device at high temperature, pressure, and shear, which breaks organic contaminants, including stickies, into smaller pieces.

Various chemical methods can be used. For instance, in pacification, additives like talc, clay, nonionic organic polymers, and other inorganic particles are used to render the stickies less tacky. In dispersion, dispersants, surfactants, and solvents are used to make stickies smaller.

In fixation, the stickies are attached to the paper sheet by using a cationic water soluble polymer, which adds charge to the stickies. In disperse and fix, a dispersant is added first to reduce the size of the stickies and then a cationic polymer is used to fix the stickies onto the sheet. With passivation, the use of dispersants, solvents, and low molecular weight cationic polymers makes the paper machine less susceptible to stickies.

The favored approach to remove stickies is to keep the stickies large in the stock prep area, so that the mechanical cleaning equipment can remove as many "stickies" as possible. Then, all remaining stickies should be dispersed either mechanically or chemically and fixed to the fiber, so that it can be sent out with the sheet.

Once as many stickies as possible are removed mechanically, the rest have in the past been dispersed mechanically, chemically, or by using a combination of the two. Once dispersed, polymer addition to stabilize these particles in their smallest state has been used, so that the particles will be retained on the sheet.

Measuring and controlling stickies in a recycled paper manufacturing process has always been a challenge. Variations in recycled paper quality and the trend to increase the amount of waste paper incorporated into each ton of pulp produced are each contributing factors that make this challenge even more difficult to address. (Pulp and Paper Fact Book, 2000). These variations make predicting the amount of stickies that are entering a mill's system troublesome. Once these stickies are in the system, the larger contaminants, or macrostickies, are often removed mechanically. However, additional stresses on the screens and cleaner banks such as high furnish consistency, improper in-screen dilution, improper reject rates, and differential pressure control problems will facilitate the acceptance of formed macrostickies (Gallagher, 1997). Macrostickies are defined as stickies that are retained on a 0.10 mm screen plate (Heise, 1998). These contaminants which come from adhesives, coatings, binders, and other materials are incorporated into the furnish during the pulping process, and will deposit on forming fabrics, press felts, dryer fabrics, press section pick rolls, Uhle boxes, and calendar stacks ( Douek, 1997). These materials remain tacky in the papermaking process, leading to the "stickies" label (Doshi, 1997). Once the materials are incorporated into the furnish, they are difficult to remove, since they are deformable in nature and are often close to the specific gravity of water. These physical characteristics present a different screening and cleaning challenge as these contaminants slip through screens and cleaners (Scholz, 1997) that are designed to allow water and fiber to be accepted. The consequence of this fact is the acceptance of macrostickies into the post screening process.

Even if the cleaning and screening systems do perform properly and do remove most of the macrostickies, the remaining microstickies may cause problems. The agglomeration of microstickies, stickies not retained on a 0.1 mm screen, can lead to the formation of macrostickies which will then deposit onto the machine and onto fabric surfaces (Doshi, 1997). Microstickies are not problematic as long as they remain small. However, they often agglomerate in the papermaking process leading to macrostickies formation The cost of stickies deposition is a significant one. One source estimates the cost of the stickies problem to the industry in terms of machine downtime to be over $500 million annually for major recycled paper grades (Friberg, 1997). Once macrostickies are present in the furnish after the screening and cleaning systems, mechanical means of removing stickies have been exhausted. Preventing the agglomeration of microstickies is also an issue in addition to the microstickies problem. In order to address each of these problems, a chemical control solution is often required.

SUMMARY OF THE INVENTION

A feature of the present invention is to provide methods to control organic contaminants present in fibers that contain organic contaminants.

A further feature of the present invention is to provide a method to process recycled fibers in a manner such that the organic contaminants present in the recycled fibers are controlled.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages and in accordance with the purposes of the present invention, as embodied and broadly described herein, the present invention relates to a method to control organic contaminants present in fibers containing organic contaminants. The method involves contacting the fiber with a composition comprising at least one esterase or lipase for a sufficient time and in a sufficient amount to control the organic contaminants present in the fiber. The method of the present invention finds particular use with recycled fibers, such as old corrugated containers, old newsprint, mixed office waste, or combinations thereof. The esterase or lipase containing compositions can be introduced at any point in the processing of the fiber containing organic contaminants, but is preferably introduced after a flotation de-inking stage used in paper making facilities.

It is to be understood that both the foregoing general description and the following detailed description are exemplary and explanatory only and are only intended to provide a further explanation of the present invention, as claimed. The accompanying drawings, which are incorporated in and constitute a part of this application, illustrate several embodiments of the present invention and together with the written description, serve to explain the principles of the present invention.

BRIEF DESCRIPTION OF THE DRAWINGS

In each figure, a comparison is made with a control which did not contain the enzymes or polymer, if present, used in the present invention, but otherwise is the same for comparison purposes.

DETAILED DESCRIPTION OF THE PRESENT INVENTION

The present invention relates to methods to control organic contaminants present in fiber containing organic contaminants. The fiber is typically cellulose fibers and more typically are recycled fibers from a variety of paper products or fiber containing products, such as old corrugated containers (OCC), old newsprint (ONP), mixed office waste (MOW), or combinations thereof. These types of paper containing products typically contain large amounts of organic contaminants which are present in the paper products. When these types of paper products are recycled, these organic contaminants are present along with the fibers formed during the pulping stage of a papermaking process. These organic contaminants, if not substantially removed, can severely interfere with subsequent stages in the papermaking process by effecting the quality of the resulting sheets of paper formed and/or effecting the machinery used to form the paper. Accordingly, the removal of such organic contaminants is important to the paper making process when such organic contaminants are present in fibers.

For purposes of the present invention, examples of organic contaminants include what is known in the industry as "stickies" and include, but are not limited to, synthetic polymers resulting from adhesives and the like, glues, hot melts, coatings, coating binders, ink residues, de-inking chemicals, wood resins, rosin, and unpulped wet strength resins. These type of materials are typically found in paper containing products, such as newsprint, corrugated container, and/or mixed office waste. These organic contaminants typically will have polymers present, such as styrene butadiene rubber, vinyl acrylates, polyisoprene, polybutadiene, natural rubber, ethyl vinyl acetates, polyvinyl acetates, ethylvinyl alcohols, polyvinyl alcohols, styrene acrylates, and other synthetic type polymers.

In the process of the present invention, these organic contaminants are controlled by contacting the fiber containing the organic contaminants with a composition containing at least one esterase or lipase for a sufficient time and in a sufficient amount to control the organic contaminants present in the fiber. The compositions of the present invention preferably disperse or convert the organic contaminants to organic species that do not affect the paper making process. For instance, the polyvinyl acetates are preferably dispersed and/or converted to polyvinyl alcohols, which do not affect the papermaking process. This preferred manner that the compositions achieve control of organic contaminants is quite different from collecting contaminants by flotation.

The composition containing at least one esterase or lipase or both preferably contains a high concentration of esterase and/or lipase. The lipase can be derived or isolated from pancreatic sources (e.g., pancreatic lipase) or from various fungi and/or bacteria, and/or other microorganisms. Examples include, but are not limited to, triacylglycerol acylhydrolase, and triacyl glycerol lipase. Also, any lipase or esterase capable of hydrolyzing triglycerides to glycerol and fatty acids can be used. Commercially available products containing esterase or lipase can be used. For instance, Buzyme® 2515 and Buzyme® 2517 can be used which are products available from Buckman Laboratories International, Inc. Products containing such enzymes as Resinase A2X, Novocor ADL, Pancreatic Lipase 250, Lipase G-1000, Greasex 50L, and Greasex 100L products can be used in the methods of the present invention. Such products are available from such commercial sources as Genencor and Novo Nordisk. The esterase or lipase described in U.S. Pat. Nos. 5,507,952 and 5,356,800 can be used in the present invention and these patents are incorporated in their entirety along with any other patent publications mentioned in this application, by reference herein. The enzyme or lipase can generally be used in any form, such as liquid form or solid form. Preferably, the amount of esterase or lipase used in the methods of the present invention are a sufficient amount to control the organic contaminants present in the fiber. Preferred amounts of esterase and/or lipase are from about 0.005 lbs. to about 4.0 lbs. per ton of dry fiber, and more preferably from about 0.01 to about 2.0, and most preferably from about 0.05 to about 0.5 per ton of dry fiber treated.

The esterase and lipase compositions are preferably stabilized compositions using the formulations described in U.S. Pat. Nos. 5,356,800 and 5,780,283, incorporated in their entirety by reference herein. In the methods of the present invention, at least one polymer can be also added to the fiber containing the organic contaminants. At least one polymer can be added together with the composition containing at least one esterase or lipase or at about the same time. Alternatively or additionally, one or more polymers can be added before or after the introduction of the esterase or lipase. For instance, the polymer(s) can be added one hour or less before or after introduction of the esterase or lipase to the fiber. Preferably, the polymer is a water soluble polymer and is more preferably a cationic water soluble polymer. Examples of such polymers include, but are not limited to, epichlorohydrin\dimethylamine polymers (EPI-DMA) and cross-linked solutions thereof, polydiallyl dimethyl ammonium chloride (DADMAC), DADMAC/acrylamide copolymers, ionene polymers, and the like. Examples of ionene polymers include, but are not limited to, those set forth in U.S. Pat. Nos. 5,681,862 and 5,575,993 both incorporated in their entireties by reference herein. Further, the polymers set forth in U.S. Pat. No. 5,256,252 can be used as well and this patent is incorporated in its entirety by reference herein. The polymer if used in the methods of the present invention can be used in any amount and preferably in dosage ranges of from about 0.1 to about 15 pounds per ton of dry fiber treated, more preferably from about 0.25 pounds to about 10 pounds per ton of dry fiber treated, and more preferably from about 1 pound to about 5 pounds per ton of dry fiber treated.

For purposes of the present invention, controlling organic contaminants present in fibers having organic contaminants is understood as one or more of the following: reducing the size of contaminant particles, reducing the number or amount of measurable particles present, and/or reducing the tackiness of the organic contaminants. Preferably, when controlling organic contaminants using the methods of the present invention, all of these reductions occur. Preferably, the reduction of the size of contaminant particles is by at least about 5%, more preferably by from about 10% to about 75% as compared to when no esterase or lipase is present. Similarly, the reduction in the number or amount of organic contaminants present in the fiber is reduced by at least about 5%, and more preferably by from about 10% to about 75% when compared to fibers which have not been treated with esterase or lipase. Also, the reduction of tackiness of the organic contaminants is preferably reduced by at least about 5%, and more preferably by from about 10% to about 75% when compared to fibers which have not been treated with esterase or lipase.

The compositions containing at least one esterase or at least one lipase, or both can also contain as an option other conventional paper treatment chemicals or ingredients such as, but not limited to, surfactants, solvents, suspension aids, fillers, chelants, preservatives, buffers, water, stabilizers, and the like. These additional ingredients can be present in conventional amounts.

Generally, the composition containing at least one esterase, at least one lipase, or both is introduced or brought into contact with the fiber containing the organic contaminants in any fashion. For instance, if the fiber containing the organic contaminants originates from products to be recycled, the esterase or lipase containing compositions can be introduced prior to the pulping stage, during the pulping stage, or after the pulping stage. If the esterase or lipase containing compositions are introduced prior to the pulping stage, typically, the composition will be introduced such as by spraying or other means, onto the paper containing product which are going to be introduced into the pulper. Also, or alternatively, the esterase or lipase containing compositions can be present or introduced into the pulper during the pulping stage which can be by any conventional pulping technique such as mechanical pulping, full chemical pulping, or combinations thereof. The esterase or lipase containing compositions can be introduced during the stock preparation stage of the papermaking process. Preferably, the contact time of the esterase or lipase containing composition with the fibers containing organic contaminants should be maximized. Preferably, the contact time should be sufficient to control the organic contaminants present with the fibers such that organic contaminants are substantially controlled. Preferably, the contact time is from about 1 min. to about 8 hours, more preferably from about 15 min. to about 4 hours, and most preferably from about 30 min. to about 2 hours.

The esterase or lipase containing compositions can be introduced or brought into contact with the fiber containing organic contaminants at the thick stock storage stage or prior to the flotation de-inking stage. Preferably, the esterase or lipase containing compositions are introduced after the flotation stage in the papermaking process. More preferably, the esterase or lipase containing compositions are introduced after the flotation stage and before the paper machine headbox. The compositions can be added in the paper machine white water. In some papermaking processes, there is no flotation step, such as with the recycling of OCC. Thus, the esterase or lipase containing compositions are preferably added at or after the pulper and/or at or before the headbox. The compositions can also be added in the paper machine white water.

The manner in which the esterase or lipase containing composition is introduced or brought into contact with the fiber containing the organic contaminants can be in any fashion, such as by injection points, pouring the enzyme or lipase containing compositions into the area to be treated, and/or using repulpable bags of dry or liquid enzymes. The introduction of the esterase or lipase can be immediate, slow release, timed release, intermittent, and/or continuous.

In the methods of the present invention, the esterase or lipase containing compositions can be introduced at multiple points or at just one point of the papermaking operation. In addition, more than one type of esterase or lipase containing compositions can be used, mixtures can be used, or any other variations as long as at least one esterase or lipase is introduced in some fashion in order to control organic contaminants present in fibers having organic contaminants.

In the methods of the present invention, the controlling of the organic contaminants present in fibers having organic contaminants can be incorporated into any papermaking operation. Typically, the remaining aspects of the papermaking operation as is known to those skilled in the art can be used in order to form paper products. Thus, the conventional additive materials used with papermaking pulps during stock preparation can be used as well in the present invention. Continuous or non-continuous papermaking machines can then convert aqueous suspensions of fibers and other ingredients into dry sheets of paper using such conventionally known operations which involve Fourdrinier machines or cylinder machines or other papermaking devices. Subsequent treatments of the sheets of paper to achieve the desired characteristics such as machine calendering and/or coating of the papersheets and the like can also be used in the present invention.

The present invention will be further clarified by the following examples, which are intended to be purely exemplary of the present invention.

EXAMPLES

Examples 1–3

In each of the following examples, a machine chest stock resulting from old news print, mixed office waste, or old corrugated containers was obtained from a mill and had approximately 3 to about 5% by weight consistency of fibers or solids. This stock was then diluted to a 1% by weight consistency and heated to approximately 50 to 60° C. 1,000 milliliter samples of the dilute stock were then placed on a hot plate to maintain the 50 to 60° C. temperature and the dilute stock was mixed at a constant rate of approximately 100–150 rpm. Then, 0.05 to about 0.5 lbs. of enzyme per ton of dry fiber was added to the furnish and the samples were mixed for 1 to 2 hours.

The samples were then diluted to 10 liters by introducing water and then these samples were screened through a Pulmac Masterscreen using a 0.004 inch screen. The contaminants collected on the filter pad were dried in an oven. A clean piece of filter paper was placed on top of the collection pad and both pieces were then placed on a Carver Press and pressed for 3 minutes at 300° F. (135° C.) at a pressure of 10,000 psi. The top filter was then peeled off and the amount of contaminants by ppm were measured using an Optimax Flatbed Scanner. With respect to the furnish originating from old corrugated containers, the furnish after being treated was pressed as described but then dyed with a black dye. The black dye is such that the organic contaminants will not adsorb the dye which thus sets them apart for measurement. The amount of organic contaminants was thus measured using an image analyzer which is similar to a flatbed scanner. In these examples, Resinase A 2x, formulated into Buzyme® 2517 was used for MOW and OCC. Novo Cor ADL, formulated into an ADL formulation, was used for the ONP. 1.0 lb/ton of Buzyme® 2517 was used for the MOW. 1.5 lbs/ton of Buzyme® 2517 was used for OCC and 2.0 lbs/ton of formulated ADL was used for ONP. Each amount is based upon the per ton weight of the dry fiber treated. The formulated ADL composition was prepared by mixing about 5–10% enzyme with 5% alcohol ethoxylate (Christalnol 1107 having 7 mols of ethylene oxide); 15–20 wt. % PVT K-90 and 40–50% propylene glycol and the balance water, all percents by weight.

Figure 1:
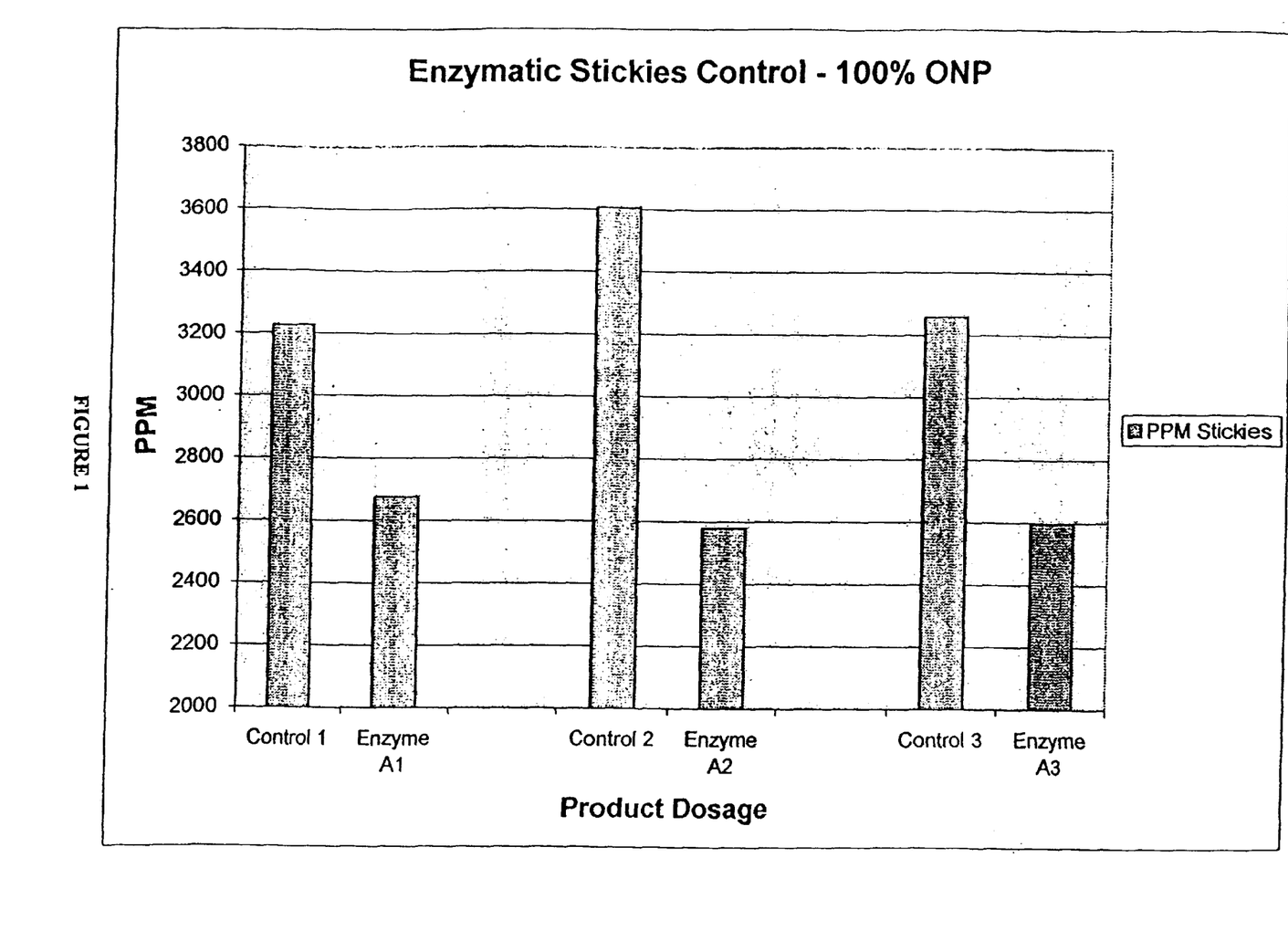
FIG. 1 is a bar graph depicting the reduction in organic contaminants using enzymes in a 100% old newsprint furnish.
Figure 2:
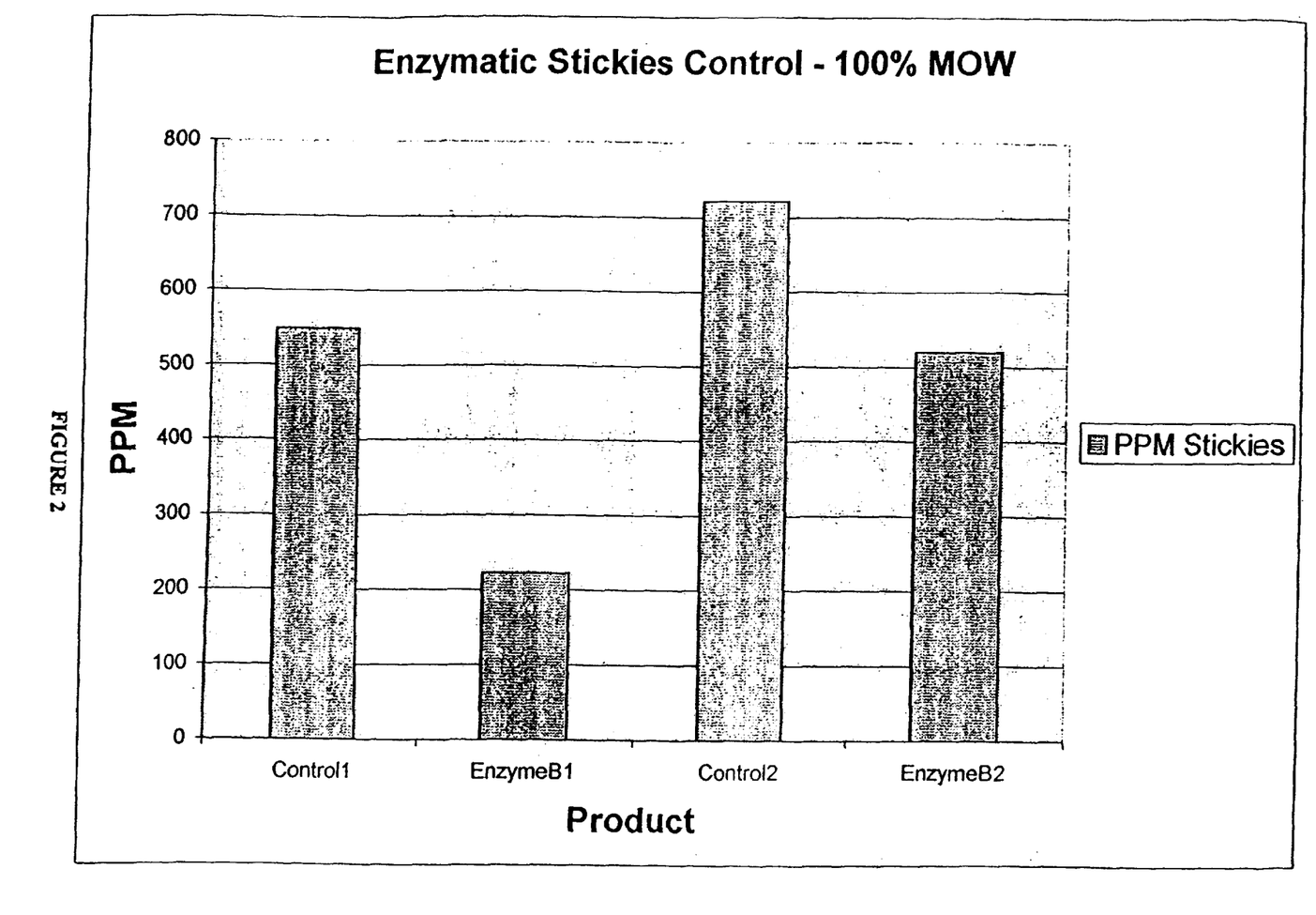
FIG. 2 is also a bar graph depicting the reduction of organic contaminants using enzymes in a 100% mixed office waste furnish.
Figure 3:
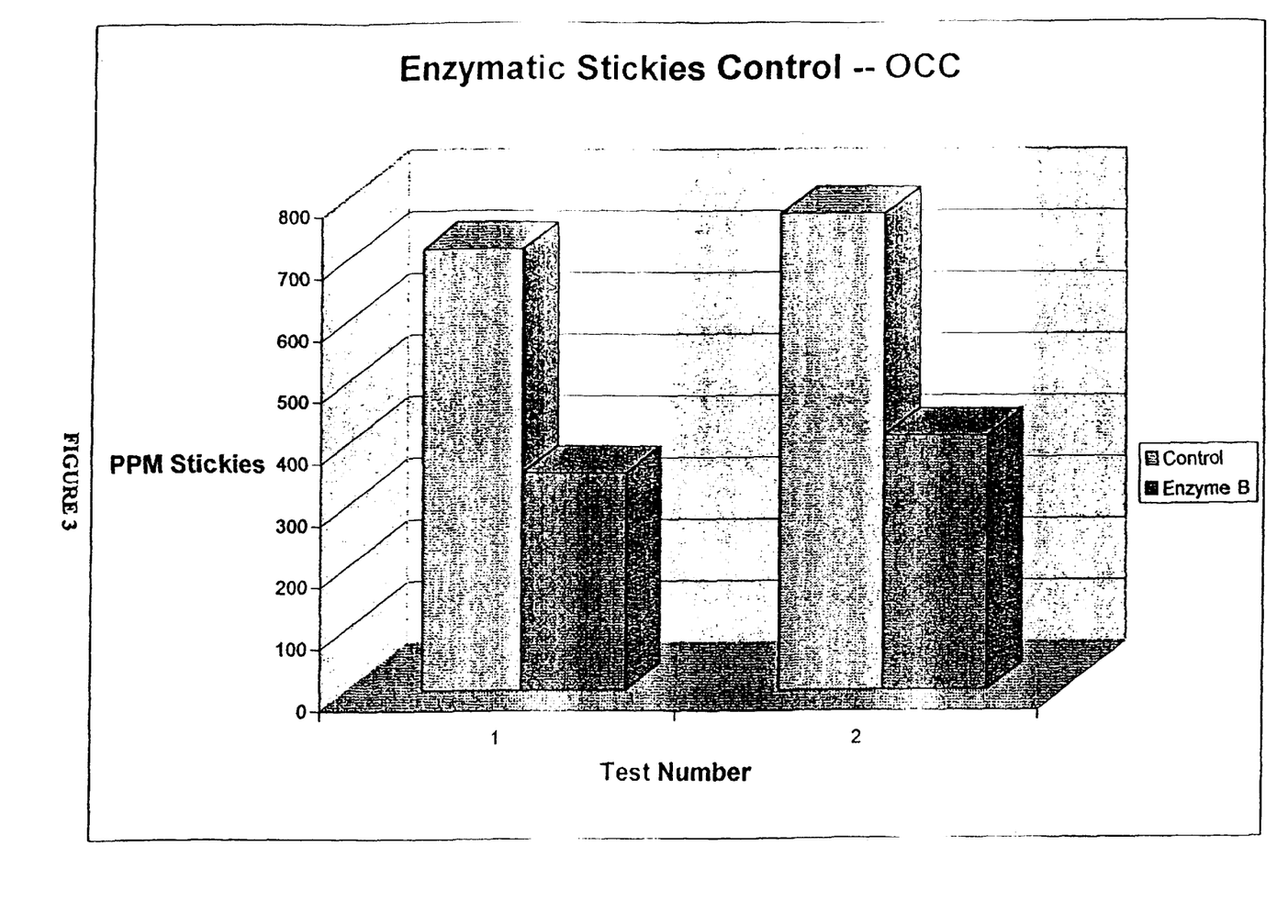
FIG. 3 is a bar graph depicting the reduction in organic contaminants using enzymes in a 100% old corrugated container furnish.

The results are set forth in FIGS. 1–3 and are compared to a Control wherein the same procedure as described above was followed except no enzyme was added to the furnish. As can be seen, the amount of ppm organic contaminants or "stickies" was significantly reduced when the esterase or lipase containing composition was used. In fact, in most instances, the method of the present invention reduced the amount of organic contaminants by at least 20% by weight, and in some instances reduced the amount of organic contaminants by 40%, or more than 50% by weight. Thus, the present invention was quite effective in reducing the amount of organic contaminants in fibers containing such organic contaminants.

Examples 4–6

In these examples, the testing procedure of Examples 1–3 was followed except a polymer was added to the furnish. In particular, a polymer was added one hour after the enzyme was added and then mixed for 15 minutes before testing.

Figure 4:
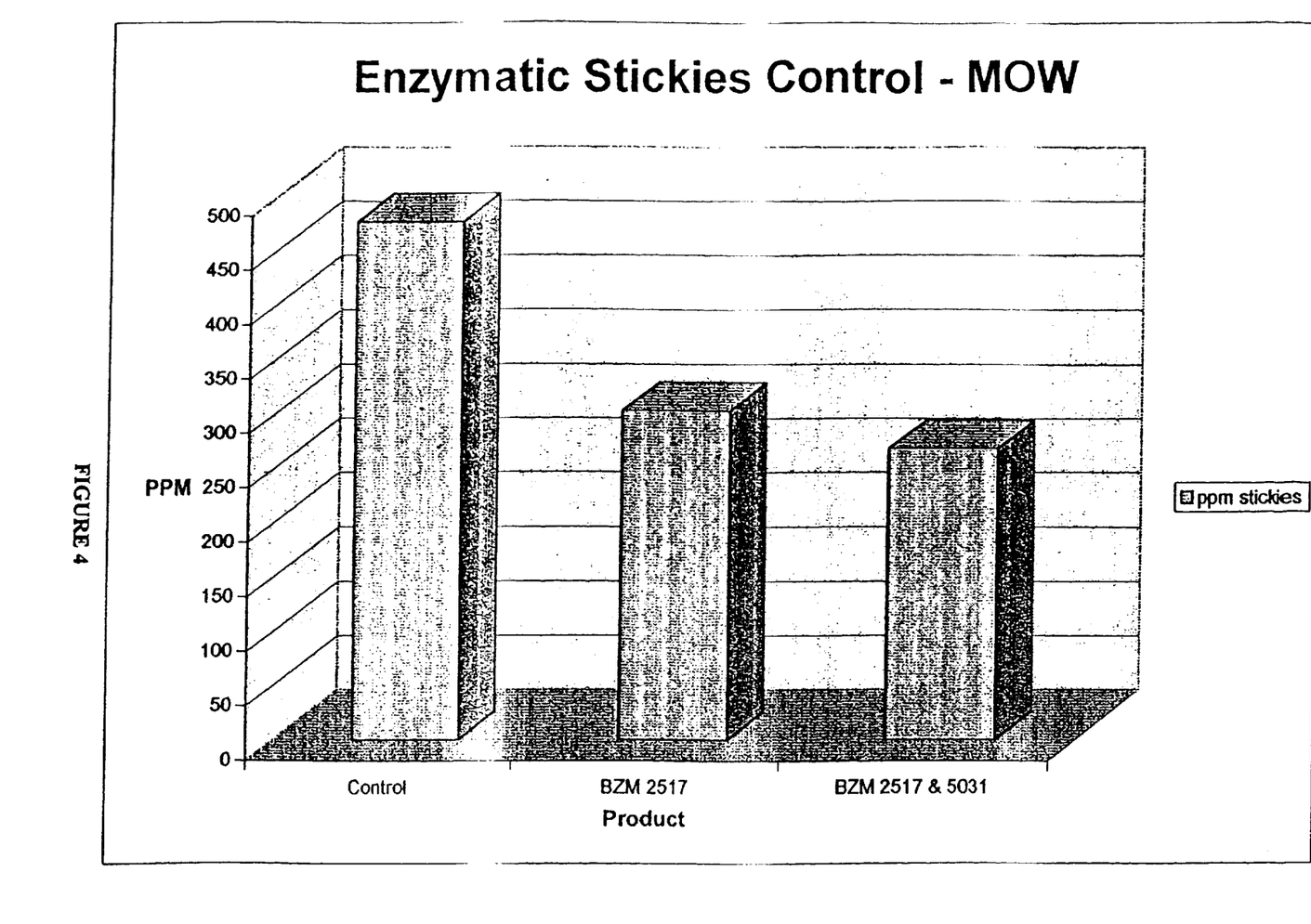
FIG. 4 is a bar graph depicting the reduction in organic contaminants using enzymes and at least one polymer in a 100% mixed office waste furnish.
Figure 5:
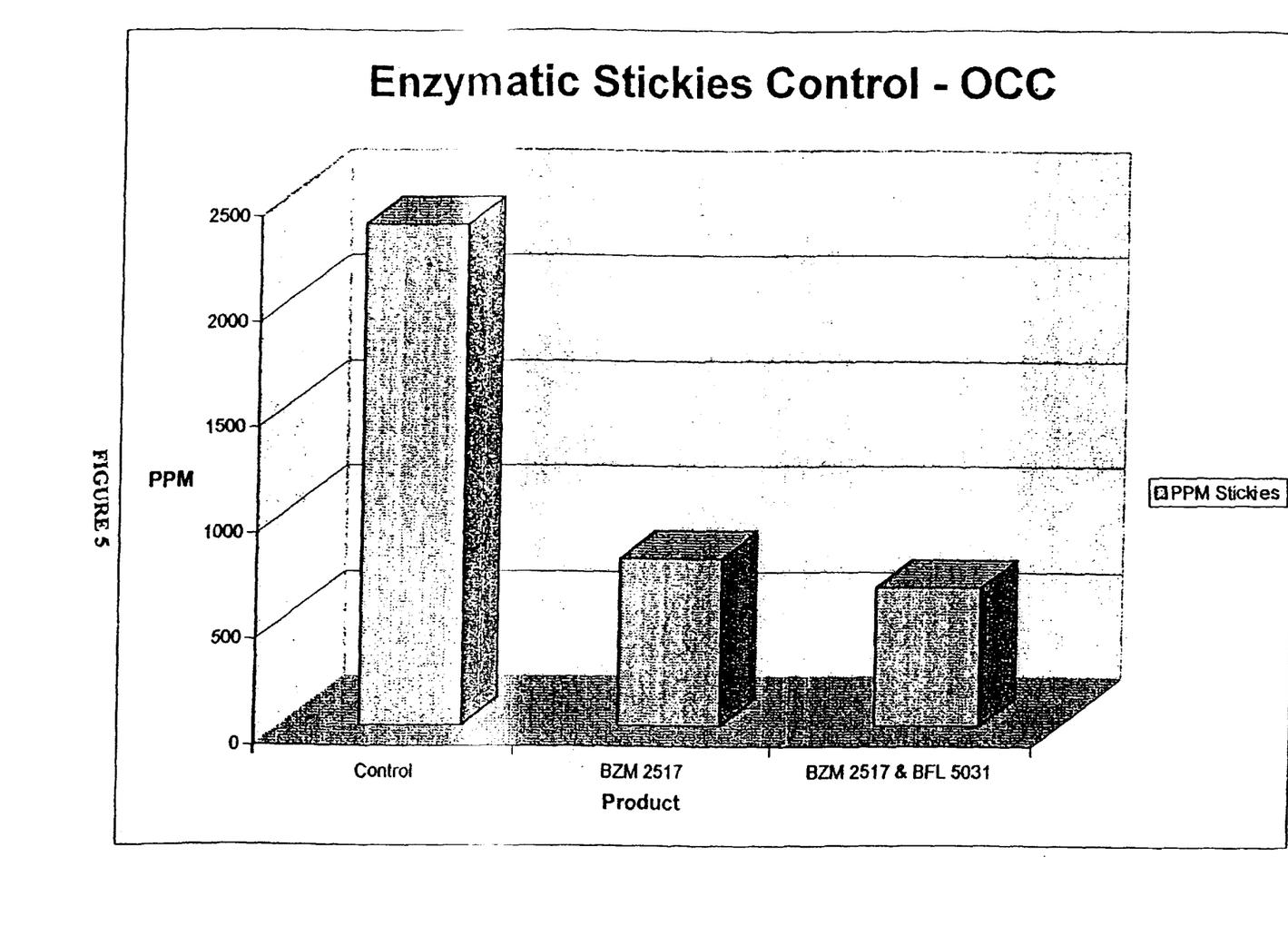
FIG. 5 is also a bar graph depicting the reduction of organic contaminants using enzymes and at least one polymer in a 100% old corrugated container furnish.
Figure 6:
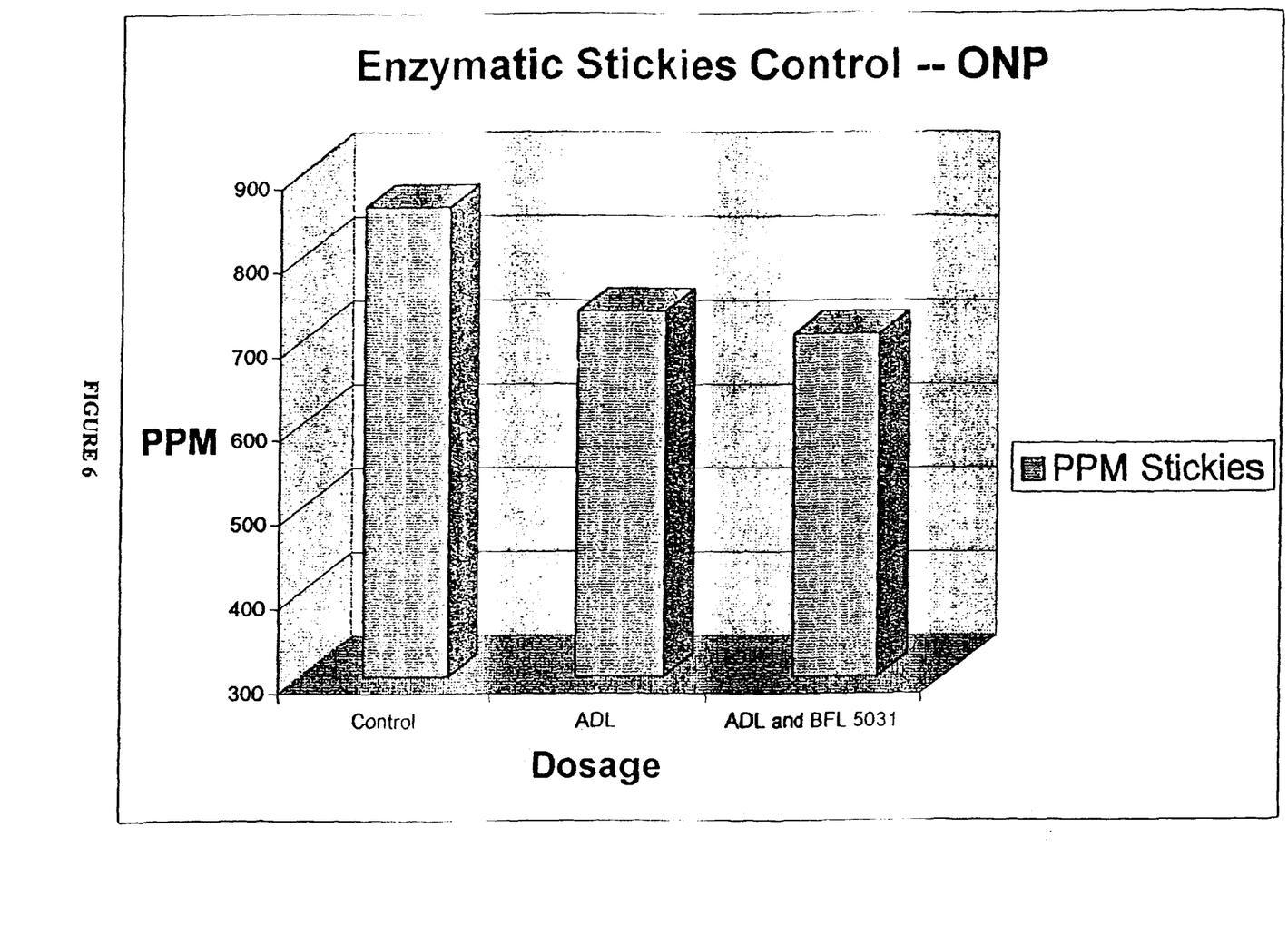
FIG. 6 is a bar graph depicting the reduction in organic contaminants using enzymes and at least one polymer in a 100% old newsprint furnish.

The results are set forth in FIGS. 4–6 and are compared to a Control wherein the same procedure as described above was followed except no enzyme was added to the furnish. As can be seen, the amount of ppm organic contaminants or "stickies" was significantly reduced when the esterase or lipase along with the introduction of at least one polymer were used. In fact, in most cases, the method of the present invention reduced the amount of the organic contaminants by at least 40% and in some cases on the order of reducing the ppms by well over 50%. In addition, in comparing these results with the use of an enzyme alone, there was a 10% or more reduction in ppm "stickies" as compared to the use of the enzyme alone as shown in comparing FIGS. 1–3 with FIGS. 4–6. The BUZYME® 2517 was introduced in an amount of 2 pounds per ton of dry fiber in Example 4 (FIG. 4) and the combination of BUZYME® 2517 and BUFLOC® 5031 were added at 2 pounds per ton of dry fiber and 10 pounds per ton of dry fiber respectively.

In Example 5, as shown in FIG. 5, the BUZYME® 2517 was introduced at a rate of 1.5 pounds per ton of dry fiber and the combination of BUZYME® 2517 and BUFLOC® 5031 were introduced at a rate of 1.5 pounds per ton of dry fiber and 10 pounds per ton of dry fiber respectively.

Finally, with respect to Example 6, as shown in FIG. 6, the amount of BUZYME® 2517 introduced was about 1.5 pounds per ton of dry fiber and the combination of BUZYME® 2517 and BUFLOC® 5031 were introduced at a rate of 1.5 pounds per ton of dry fiber and 3 pounds per ton of dry fiber respectively.

It will be apparent to those skilled in the art that various modifications and variations can be made to the embodiments of the present invention without departing from the spirit or scope of the present invention. Thus, it is intended that the present invention covers other modifications and variations of this invention provided they come within the scope of the appended claims and their equivalents.

What is claimed is:

1. A method to control organic contaminants present in recycled fibers containing organic contaminants comprising contacting said recycled fibers with a composition comprising at least one esterase that is not a lipase, for a sufficient time and in a sufficient amount to control the organic contaminants present in the recycled fibers, wherein said organic contaminants comprise synthetic polymers, adhesives, glues, hot-melts, coatings, coating binders, de-inking chemicals or combinations thereof.

2. The method of claim 1, wherein said fibers containing organic contaminants comprises fibers from old corrugated containers.

3. The method of claim 1, wherein said fibers containing organic contaminants comprises fibers from old newsprint or old newspapers.

4. The method of claim 1, wherein said fibers containing organic contaminants comprises fibers from mixed office waste.

5. The method of claim 1, wherein the organic contaminants are at least controlled by reducing the amount of organic contaminants present in the fiber.

6. The method of claim 1, wherein the organic contaminants are at least controlled by reducing the size of the organic contaminants present in the fibers.

7. The method of claim 1, wherein the organic contaminants are at least controlled by reducing the tackiness of the fibers.

8. The method of claim 1, wherein said composition is introduced prior to a pulping stage.

9. The method of claim 1, wherein said composition is introduced during a pulping stage.

10. The method of claim 1, wherein said composition is introduced during or right before a stock preparation stage.

11. The method of claim 1, wherein said composition is introduced after a flotation or a de-inking stage.

12. The method of claim 1, wherein said composition is introduced in an amount of from about 0.005 to about 4.0 lbs. per ton based on dry fiber.

13. The method of claim 1, wherein said composition is in contact with the fibers for a time of from about 1 minute to about 8 hours.

14. The method of claim 1, further comprising forming said fibers into paper or paperboard products.

15. The method of claim 1, further comprising contacting said fibers with a composition comprising at least one polymer.

16. The method of claim 15, wherein said at least one polymer is a water soluble cationic polymer.

17. The method of claim 1, wherein said composition further comprises at least one polymer.

18. The method of claim 3, wherein said at least one polymer is a water-soluble cationic polymer.

19. The method of claim 15, wherein said polymer is introduced at about the same time as said esterase.

20. The method of claim 15, wherein said polymer is introduced after introducing said esterase.

21. The method of claim 15, wherein said polymer is introduced before introducing said esterase.

22. The method of claim 1, wherein said composition is introduced prior to the paper machine headbox.

23. The method of claim 1, wherein said composition is introduced in the paper machine white water.

24. A method of making paper or paperboard products comprising:

forming a pulp slurry comprising at least fibers obtained from recycled paper or paperboard;

treating said fibers with a composition comprising at least one esterase that is not a lipase, or both for a sufficient time and in a sufficient amount to control organic contaminants present in the fiber; and forming, in the absence of a flotation stage, said fibers treated with said composition into paper or paperboard products.

25. The method of claim 24, wherein said recycled paper or paperboard is old corrugated containers.

* * * * *